UNITED STATES PATENT OFFICE.

THOMAS J. MAYALL, OF ROXBURY, MASSACHUSETTS.

IMPROVED MACHINE BELTING OR BANDING.

Specification forming part of Letters Patent No. 40,699, dated November 24, 1863.

*To all whom it may concern:*

Be it known that I, THOMAS J. MAYALL, of Roxbury, in the county of Norfolk and State of Massachusetts, have invented certain new and useful Improvements in Machine Belting or Banding; and I do hereby declare that the following description is a full and exact specification of the same, wherein I have set forth the nature and principles of my said improvements, whereby my invention may be distinguished from all others of a similar class, together with such parts as I claim and desire to have secured to me by Letters Patent.

In the manufacture and use of driving bands or belting for machinery it has been found that the two principal kinds—leather and rubber—have their advantages and disadvantages, according to the purpose for which they are used and the circumstances under which they are run. Thus, for instance, a leather belt or band will endure friction when used as a cross-belt and a rubber one will not, and, on the contrary, a rubber belt can be run through water, while a leather belt would be saturated and injured thereby. Again, a rubber belt is damaged by being subjected to the action of oil, whereas a belt made of leather or gutta-percha is free from this injurious effect under like circumstances. Lastly, a belt made of leather, when exposed to heat, becomes dry and stiff. A rubber band is free from this objection, as it is more pliable and yielding, because of its greater elasticity.

To form a driving band or belt for machinery that shall combine all the advantages of leather and rubber ones, and yet avoid the disadvantages of both, is the object of the present invention. After many practical tests I have at last succeeded in producing a belt or band that possesses all the necessary requirements—viz., one that is impervious both to oil and water, that is not injuriously affected by friction, and does not become dry and stiff when exposed to heat.

My new belting or banding is made by combining gutta-percha and leather reduced to a ground or fibrous condition, to which compound rubber may be added, if desirable. It has been demonstrated by repeated practical use that my new belting or banding made of these materials, in a manner to be more particularly hereinafter explained, embodies all the essential requisites of a perfect driving-band, susceptible of being applied to any kind of machinery and under all contingencies.

There are of course many modes by which my invention may be carried into practical use; but the one which I have found very successful I will now proceed to describe in detail.

I take eight pounds of rubber, four pounds of gutta-percha, and sixteen pounds of ground or picked leather. The gutta-percha should first have the oil extracted by any of the well-known processes for the purpose, as it can then be vulcanized, whereas if the oil remains therein it cannot be so cured. The leather I prefer to reduce to a fibrous or torn condition, as it then interlaces better with the gutta-percha and rubber and binds the whole together. To the gutta-percha, rubber, and picked leather I add from two to four pounds of white lead, zinc, pipe-clay, or other substances commonly employed in rubber and gutta-percha compounds, and sufficient sulphur for the purpose—say one pound. This compound is then passed through a grinder or mixing-mill until all of its ingredients are thoroughly incorporated with each other and reduced to a plastic condition. It is then run or spread upon duck or other body of the belt by means of calendar-rolls. For light belts no cloth or other backing or body need be used. The whole is then vulcanized in any of the usual modes practiced by rubber-manufacturers. To give it a smooth surface it may be vulcanized between sheets of flexible metal, rolled up in cloth, pressed between rigid plates, or in any other proper manner.

It will be evident that the proportions of the above-named compound can be almost endlessly varied, and some of the ingredients left out and new ones added, according to the kind of belt or band desired to be produced; but this, it will be seen, does not interfere with the general principles of my invention.

Having thus described my improvements, what I claim as my invention, and desire to have secured to me by Letters Patent, is—

1. The improvement in the manufacture of machine belting or banding which consists in forming belts or bands of gutta-percha and picked or ground leather, substantially as described.

2. In combination with the above, the admixture of india-rubber in such new belts or bands, as set forth.

THOS. J. MAYALL.

Witnesses:
JOSEPH GAVETT,
ALBERT W. BROWN.